United States Patent Office 3,185,872
Patented May 25, 1965

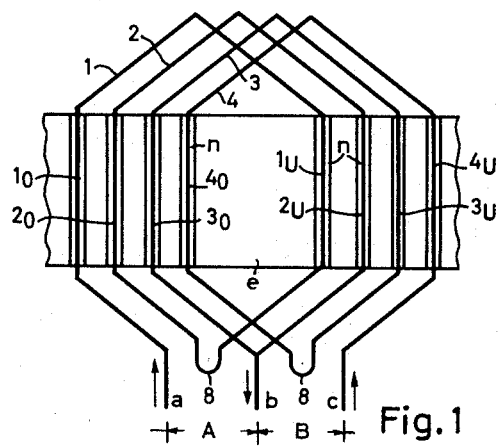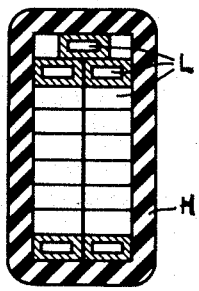
Fig. 1   Fig. 2
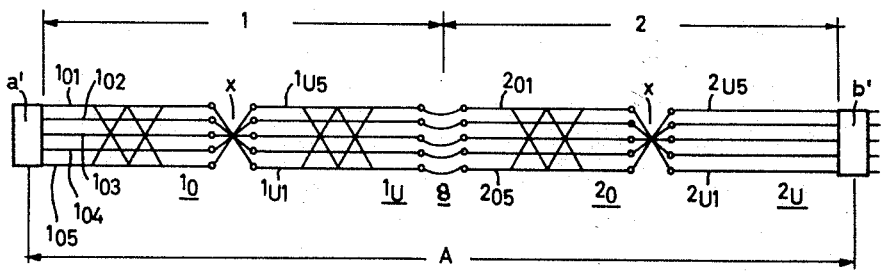
Fig. 3
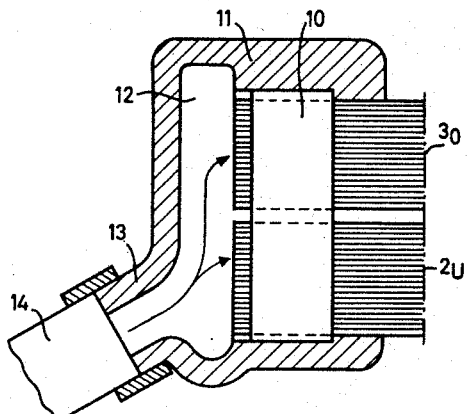
Fig. 5

3,185,872
LIQUID-COOLED WINDING FOR ELECTRIC MACHINES
Herbert Weissheimer and Arnold Abolins, both of Mulheim (Ruhr), Germany, assignors to Siemens-Schuckertwerke Aktiengesellschaft, Berlin-Siemensstadt, Germany, a corporation of Germany
Filed July 20, 1961, Ser. No. 125,549
Claims priority, application Germany, July 30, 1960, S 69,703
7 Claims. (Cl. 310—54)

Our invention relates to windings of electric machines, particularly though not exclusively to turbogenerators, in which the conductor rods passing through the slots of the laminated iron stacks of the machine are cooled by liqiud.

It is known to compose such machine windings from hollow component conductors, each consisting of a strand of rods which are transposed or twisted within each strand, for example in accordance with the so-called Roebel transposition (Standard Handbook for Electrical Engineers by A. E. Knowlton, published by McGraw-Hill Book Company, New York, 1957, Section 7–24), and to interconnect the hollow rods of each stranded conductor at the end, where they project out of the lamination stack, by metal caps which are sealed to the component conductors by soldering or welding and serve for establishing the necessary electric connection as well as for passing water or other liquid coolant through the rods.

Such devices leave much to be desired in various respects. They require a relatively large number of connecting caps and coolant connections which can be accommodated only with great difficulty because of the rather limited space available for the end turns of the machine. Such devices further involve undesirably great additional electrical losses, it being essential in this respect that the cooling of the winding by liquid increases the current-carrying capacity, which when utilized, also increases the stray magnetic fields at the front sides and hence in the end-turn spaces of the machine, thus greatly increasing the additional losses caused by short-circuiting current as a result of these stray fields. The losses are further increased by the use of the numerous connecting caps likewise subjected to the stray fields.

It is an object of our invention to devise an improved liquid-cooled winding for electrodynamic machines, employing twisted or transposed conductor rods which are stranded and composed of hollow component conductors generally of the above-mentioned type, but eliminating or greatly minimizing the above-mentioned deficiencies without requiring a design of the conductor rods departing from the conventional construction or the uniform component-conductor transposition in the stack of iron laminations.

Another, more specific object of our invention is, to reduce the number of connections required for passing the liquid coolant through the winding and to thus also reduce the number of the connecting caps. Still another object, also more specific than the one first mentioned, is to provide for such a grouping and interconnection of the hollow rods of the stranded conductors, in conjunction with the arrangement of the metal caps that form electrical as well as coolant-flow connections, that the formation of short-circuit currents due to stray magnetic fields at the front sides of the machine, which currents may find a closed path through the caps and thus result in additional losses, is virtually eliminated.

To achieve these objects and in accordance with a feature of our invention, we compose the machine winding of a plurality of electrically sequential portions of which each comprises a plurality of complete winding turns, and we further provide a number of cap members of which each interconnects two of said plural-turn winding portions at a common end turn thereof, each of the cap members forming an electric connection of the winding as well as duct means for passing liquid coolant therethrough. Furthermore, the hollow conductors in each of the winding portions are electrically insulated from each other between the two caps that are electrically attached to their respective ends, and the component conductors in the respective winding portions are electrically counter-connected so as to compensate the additional voltages that may originate from the stray magnetic fields at the axial ends of the machine.

According to another, preferred feature of our invention, each of the above-mentioned winding portions consists of only two full winding turns of which each comprises an upper rod and a lower rod of the winding. With such a design of the winding, the number of connecting caps is considerably reduced, and the length of the flow paths for the coolant liquid within the winding is likewise reduced so that an only slight heating of the water or other coolant is encountered.

According to still another feature of our invention, the above-mentioned compensating counter-connection of the component conductors within a winding portion is obtained by repeatedly shifting the course of the individual conductors in radial direction as well as in tangential direction by means of conductor loops located in the middle of each winding portion. As will be shown, this manner of obtaining the desired compensation results in a particularly simple design of the winding as a whole.

In the following, the invention will be further described with reference to an embodiment of a multi-phase winding for the stator of a generator illustrated by way of example on the accompanying drawings in which:

FIG. 1 shows schematically a planar development of part of the alternating-current generator, representing the slotted stack of laminations with one of the phase windings according to the invention;

FIG. 2 is a cross section through one of the conductor rods of the winding shown in FIG. 1;

FIG. 3 shows schematically the electric circuit connection of the component conductors within a single winding portion;

FIG. 5 shows in cross section one of the connecting caps at the connecting location of the winding;

Figure 4:
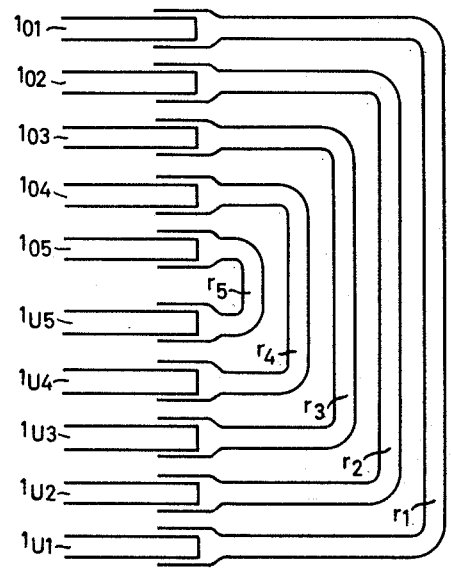
FIG. 4 illustrates schematically the connection of the hollow conductor rods at the connecting points within the winding portion.

In the planar development of the stator body shown in FIG. 1, the stack of laminations is denoted by $e$. It is provided in the conventional manner with slots $n$ which are uniformly distributed over the periphery and extend from one axial end to the other for accommodating the conductor rods of which the stator winding is composed. Only the winding for a single phase is illustrated to prevent obscuring the diagram, the other windings, required for multi-phase machines, being identical with the one illustrated and the three windings being 120° displaced from each other. The winding, which in the illustrated embodment is designed as a loop-type winding, is formed by four series-connected coils or full turns denoted by 1, 2, 3 and 4. Although only four such turns are shown, it will be understood that a larger number of turns per phase may be present. The individual turns are composed of upper rods $1_O$, $2_O$, $3_O$, $4_O$ and lower rods $1_U$, $2_U$, $3_U, 4_U$. The rods, following each other along the periphery, are electrically connected with each other by respective end turns in the sequence $1_O$–$1_U$–$2_O$–$2_U$–$3_O$–$3_U$–$4_O$–$4_U$.

The designations "upper rods" and "lower rods" indicate the position of the rods in the respective slots, i.e. whether a rod is located in the upper or lower portion of the slot. Each conductor rod comprises a straight portion passing through a slot of the iron body $e$, and a bent-off end-turn portion. At the extremities of the end turns the rods are electrically connected with each other so as to constitute the above-mentioned electrical sequence.

The individual upper and lower rods of the conductors have a hollow cross section according to FIG. 2, it being understood that while only a few of the component conductors in FIG. 2 are shown to have hollow cross sections, all of them are tubular. The tubular strand components L are arranged in two rows beside each other. Within the straight rod portion located within the slots $n$ of the machine the component rods are transposed in accordance with the Roebel principle, in order to prevent the generation of non-uniform additional voltages within the iron body of the machine due to non-uniformity of the stray field in the slots, thus also preventing the additional losses that may otherwise be caused. The composite rod is enclosed within an insulating sleeve H, thus being insulated as a whole from the walls of the slot.

As explained, it is essential to the invention that each winding and hence each phase strand be subdivided into a plurality of equal winding portions, each comprising a plurality of individual coils or full turns. In the embodiment shown in FIG. 1, the turns 1 and 2 form together a single winding portion A, and the turns 3 and 4 form a second winding portion B. The liquid coolant is supplied at $a$ and $c$, and leaves the two winding portions at $b$. Only at the localities $a$, $b$, $c$ are the hollow conductors within the winding strand conductively connected with each other by connecting caps of metal which are placed over the ends of the end-turn extremities of the electrically interconnected rods and which simultaneously serve for passing liquid coolant through the rods. Otherwise, however, the tubular component conductors of the rods within each winding portion are insulated from each other, for example by a varnish coating, thus avoiding a short-circuiting connection at all places between the extremities of the electrically interconnected ends. The connection of the caps with the end turns is preferably effected by soldering or welding. In the middle of each winding portion the component conductors extend in a loop-shaped configuration 8 of a particular design in order to obtain an electric counter-connection of the component conductors in the two halves of the winding portion as will be more fully explained below.

The arrangement and electric connection of the component conductors in winding portion A, consisting of turns 1 and 2, is represented more in detail by the circuit diagram of FIG. 3. For simplification it is assumed that each of the conductor rods $1_O$, $1_U$, or $2_O$, $2_U$ forming the respective turns 1 and 2 is composed of five component conductors $1_{O1}$ to $1_{O5}$ and $1_{U1}$ to $1_{U5}$, or $2_{O1}$ to $2_{O5}$ and $2_{U1}$ to $2_{U5}$, which within the slots are arranged conventionally in two rows of component conductors according to FIG. 2 and are Roebel transposed. In FIG. 3, the connecting caps at the location $a$ and $b$ of FIG. 1 are denoted by $a'$ and $b'$. Cap $a'$ supplies liquid coolant to the winding portion consisting of turns 1 and 2, and cap $b'$ serves to discharge the coolant therefrom. Cap $b'$ also serves for electrically connecting the winding portion A with the adjacent winding portion B consisting of turns 3 and 4 (FIG. 1), and also serves to discharge liquid coolant from winding portion B.

At the end-turn locations $x$ (FIG. 3) the component conductors are connected with each other by simple U-shaped tubular connectors which permit a series connection of the component conductors relative to the stray-field voltages in the end-turn spaces of the machine as explained above. Such tubular connectors will be described below with reference to FIG. 4. However, in the middle of each winding portion a counter-connecting loop 8 of particular design is provided. These loops, located for example between the winding turns 1 and 2, connect the component conductors $1_{U1}$ to $1_{U5}$ and $2_{O5}$ to $2_{O1}$ with each other in such a way that the component strands of turns 1 and 2 are not connected in series but in mutually opposed voltage relation with respect to the stray-field voltages in the end-turn spaces. Thus, the component conductor $1_{U5}$ is connected with component conductor $2_{O1}$, conductor $1_{U4}$ with conductor $2_{O2}$, and conductor $1_{U1}$ with conductor $2_{O5}$, for example. This counter-connection within a limited winding or cooling area has the consequence that stray magnetic fields at the end-turn spaces of the machine do not virtually produce any short circuits or loop currents within the winding portions.

The connection of the tubular component conductors at the locations denoted by $x$ in FIG. 3 are represented more in detail in FIG. 4. The ends of the conductor rods $1_{O1}$ to $1_{O5}$ and $1_{U1}$ to $1_{U5}$, arranged in two groups within a radial plane at different distances respectively from the machine axis, are pairwise interconnected by U-shaped tubular connector $r_1$ to $r_5$ of different respective width measured between the legs of the U-shape. The tubular connectors are joined with the ends of the tubular component conductors by soldering or welding.

FIG. 5 illustrates an embodiment of the connecting cap 11, for example at the connecting location $b'$ in FIG. 3 or $b$ in FIG. 1. The cap 11 electrically interconnects the upper rod $3_O$ and the lower rod $2_U$. For improving the electric connection, an additional sleeve 10 of copper is preferably provided. The cap 11 forms a plenum space 12 from which liquid coolant is distributed into the interior of the individual component conductors of each stranded rod. The cap has a nipple portion 13 to which a coolant-supply conduit 14 consisting, for example, for insulating material is attached. As indicated by arrows, the coolant coming from conduit 14 passes through the space 12 into the individual component conductors which are all electrically short-circuited by the cap and by the connecting sleeve 10.

Figures 6, 7:
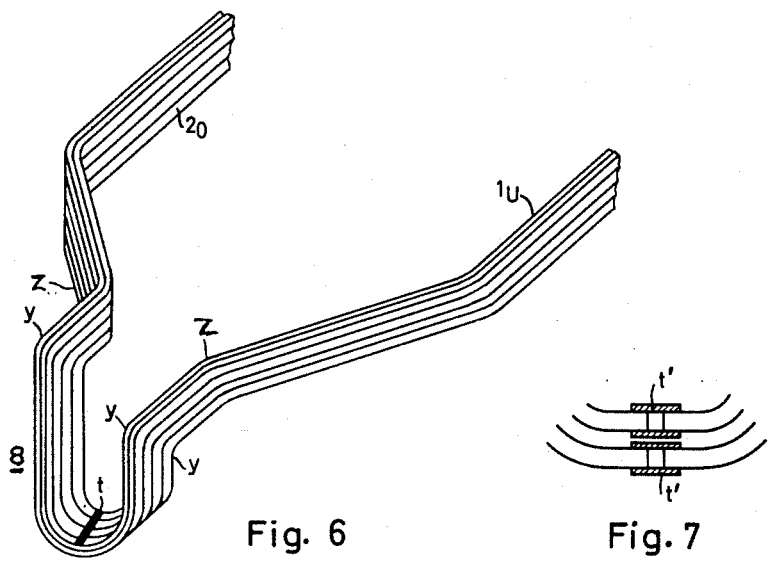
FIG. 6 is a perspective view of part of a connecting loop showing the electric counter connection of the component stranded conductors within a winding portion.
FIG. 7 shows a modified connection applicable in lieu of those shown in FIG. 4.

Details of the counter-connecting loop at the location 8 in FIGS. 1 and 3 are apparent from FIG. 6. The illustration in FIG. 6 is based on the assumption that the tubular component conductors of the rods are arranged in two planes beside each other. The illustrated counter-connecting loop is designed as follows. The side portions of the rods, for example the lower rod $1_U$ and the upper rod $2_O$, both being composed of component conductors as explained above, are bent off at the location $z$ an amount corresponding to the width of the conductor rods. The bent-off side portions of the conductor rods are again bent at the location $y$ about their narrow edges and then abut against other in their loop-shaped parts. In the middle of the loop thus formed, the individual component conductors are joined with each other, for example by hard soldering or soft soldering, at the location $t$. The joining is so effected that the cooling channels of the interconnected rods remain in communication with each other. Such a loop formation had the consequence that the interconnected component conductors of the upper rod and the lower rod occupy the same position. That is, the upper layer of the component conductors forming the upper rod is connected with the upper layer of the component conductors that form the lower rod. In an analogous manner, a connection is established between the layers of component conductors that follow in the direction toward the bottom of the slot. Also in a corresponding manner, the loop connection joins the component conductors of the outer row of conductors with each other and also joins the component conductors of the inner row with each other.

The joining of the component conductors at the location t in FIG. 6 may be effected by directly soldering or welding the tubes together. However, the junction may also be effected by means of a connecting sleeve, shown at t' in FIG. 7, which overlaps the respective ends of the two adjacent component tubular conductors and is joined and sealed thereto by hard soldering or soft soldering.

By virtue of the invention, combining the coolant circulation of the machine winding with the electric through-connection of the component stranded conductors of Roebel-transposed conductor rods within limited plural-turn portions of the winding, the manufacture of the winding as a whole is considerably simplified and the additional electric losses encountered by the winding are simultaneously greatly minimized in comparison with the machine windings heretofore known.

We claim:

1. In combination with a slotted iron body of an electrodynamic machine, a liquid-cooled winding passing through the slots of said body and being composed of internally transposed component conductors which are tubular and form a coolant conduit, said winding comprising a plurality of electrically sequential winding portions each including a plurality of winding turns, a number of cap members each interconnecing two of said winding portions at an end turn of said winding, each of said cap members forming an electric terminal connection of said winding and having duct means communicating with the interior of said interconnected winding portions for passing liquid coolant therethrough, said tubular conductors in each of said winding portions being electrically insulated from each other and being electrically counter-connected with each other for substantially compensating the additional voltages due to the stray magnetic fields at the axial ends of the machine.

2. In combination with a slotted stator of a dynamoelectric machine, a liquid-cooled stator winding traversing the slots of said stator and being composed of stranded rods having component conductors Roebel-transposed in said slots, said component conductors being hollow and forming tubes for the passage of coolant through said winding, said winding comprising a plurality of electrically sequential winding portions each including a plurality of winding turns, a number of cap members each interconnecting two of said winding portions at an end turn of said winding, each of said cap members forming an electric terminal connection of said winding and having duct means communicating with the interior of said interconnected winding portions for passing liquid coolant therethrough, said component conductors in each of said winding portions being electrically insulated from each other and being electrically counter-connected with each other for substantially compensating the additional voltages due to the stray magnetic fields at the axial ends of the machine.

3. In a liquid-cooled electric machine winding according to claim 5, each of said winding portions consisting of only two full winding turns, the component conductors of one of said turns being counter-connected with those of the other turn for compensating said additional voltages due to stray magnetic fields.

4. In a liquid-cooled electric machine winding according to claim 5, each of said winding portions having a middle part located at an end turn of the winding and forming a loop, said component conductors of the respective half-sections of said winding portions being counter-connected at said loop.

5. In a liquid-cooled electric machine winding according to claim 1, said component conductors being internally transposed within the slots.

6. In combination with a slotted iron body of an electrodynamic machine, a liquid-cooled winding passing through the slots of said body and being composed of internally transposed component conductors which are tubular and form a coolant conduit, said winding comprising a plurality of electrically sequential winding portions each including a plurality of winding turns, a number of connectors, each interconnecting two of said winding portions at an end turn of said winding, each of said connectors forming an electric terminal connection of said winding, and duct means communicating with the interior of said interconnected winding portions for passing liquid coolant therethrough, said tubular conductors in each of said winding portions being electrically insulated from each other and being electrically counter-connected with each other for substantially compensating the additional voltages due to the stray magnetic fields at the axial ends of the machine.

7. In combination with a slotted stator of a dynamoelectric machine, a liquid-cooled stator winding traversing the slots of said stator and being composed of stranded rods having component conductors Roebel-transposed in said slots, said component conductors being hollow and forming tubes for the passage of coolant through said winding, said winding comprising a plurality of electrically sequential winding portions each including a plurality of winding turns, a number of connectors, each interconnecting two of said winding portions at an end turn of said winding, each of said connectors forming an electric terminal connection of said winding, and duct means communicating with the interior of said interconnected winding portions for passing liquid coolant therethrough, said component conductors in each of said winding portions being electrically insulated from each other and being electrically counter-connected with each other for substantially compensating the additional voltages due to the stray magnetic fields at the axial ends of the machine.

References Cited by the Examiner

UNITED STATES PATENTS

| 2,695,368 | 11/54 | Kilbourne | 310—64 |
| 2,897,382 | 7/59 | Hamill | 310—64 |
| 2,965,775 | 12/60 | Archer | 310—64 |

FOREIGN PATENTS

| 706,616 | 3/31 | France. |

MILTON O. HIRSHFIELD, *Primary Examiner.*

DAVID X. SLINEY, *Examiner.*